United States Patent
Gazyakan et al.

(10) Patent No.: US 7,040,472 B2
(45) Date of Patent: May 9, 2006

(54) TRANSFER CASE WITH CONTROLLABLE CLUTCH

(75) Inventors: Ünal Gazyakan, Friedrichshafen (DE); Detlef Baasch, Friedrichshafen (DE); Christoph Pelchen, Tettnang (DE); Barbara Schmohl, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/776,564

(22) Filed: Feb. 11, 2004

(65) Prior Publication Data

US 2004/0163920 A1   Aug. 26, 2004

(30) Foreign Application Priority Data

Feb. 20, 2003   (DE) ............................... 103 07 019

(51) Int. Cl.
*B60K 17/344* (2006.01)
*F16D 28/00* (2006.01)

(52) U.S. Cl. ..................... 192/84.6; 192/84.7; 192/94; 180/247

(58) Field of Classification Search ................ 192/35, 192/84.6, 84.7, 94; 180/247
See application file for complete search history.

(56) References Cited

U.S. PATENT DOCUMENTS

| | | | | |
|---|---|---|---|---|
| 4,418,777 A | * | 12/1983 | Stockton | 180/65.6 |
| 4,895,236 A | * | 1/1990 | Sakakibara et al. | 192/84.6 |
| 5,199,325 A | | 4/1993 | Reuter et al. | 74/861 |
| 5,260,620 A | * | 11/1993 | Morrill | 310/185 |
| 5,423,235 A | * | 6/1995 | Botterill et al. | 74/665 GA |
| 6,484,857 B1 | * | 11/2002 | Vonnegut et al. | 192/35 |
| 6,848,550 B1 | * | 2/2005 | Puiu et al. | 192/35 |
| 2004/0163918 A1 | * | 8/2004 | Kirkwood et al. | 192/84.6 |
| 2004/0163921 A1 | * | 8/2004 | Granzow et al. | 192/84.6 |

FOREIGN PATENT DOCUMENTS

| | | |
|---|---|---|
| DE | 39 08 478 A1 | 10/1989 |
| DE | 08 26 933 A1 | 2/1990 |
| DE | 90 07 320.7 | 7/1991 |
| DE | 42 30 326 A1 | 3/1993 |
| DE | 199 16 366 A1 | 10/2000 |

\* cited by examiner

*Primary Examiner*—Richard M. Lorence
(74) *Attorney, Agent, or Firm*—Davis & Bujold, P.L.L.C.

(57) ABSTRACT

A transfer case (1) with controllable clutch (5) for a motor vehicle, especially for a motor vehicle with part-time four-wheel drive, for distributing a driving torque coming in via a drive shaft (2) to at least two output shafts (3, 4). Hereby the output shaft (4) can be connected to the drive shaft (2) via the clutch (5), and the clutch (5) can be actuated via an electric motor (9) and a drive converter device (10) that is arranged between the electric motor (9) and the clutch (5) for converting a rotatory motion of the electric motor (9) into a translatory actuating motion for the clutch (5). The electric motor (9) is hereby designed as an induction motor.

6 Claims, 2 Drawing Sheets

TRANSFER CASE WITH CONTROLLABLE CLUTCH

This application claims priority from German Application Serial No. 103 07 019.2 filed Feb. 20, 2003.

FIELD OF THE INVENTION

The invention relates to a transfer case with controllable clutch.

BACKGROUND OF THE INVENTION

Locking transfer cases for an all-wheel drive system or systems with part-time four-wheel drive, in which a locking or coupling function for activating one or more drive wheels comprises a clutch designed as a multi-disk clutch, are known from practice. Actuation of the clutch takes place by means of an electric motor, which acts, for example, via a gear designed as a spur gear upon a gear segment ring which, in turn, is connected to a spindle of a drive converter device.

A spindle nut, which is arranged on the spindle, is rotatably fixed in such a transfer case and is adjusted axially during a rotational motion of the spindle, in accordance with a pitch of a thread of the spindle. As a function of the direction of rotation of the electric motor, the clutch is opened or closed via the axial motion of the spindle nut.

The electric motor is hereby designed as a direct-current motor with brushes, which is combined with an electromagnetic brake in order to allow the electric motor to be shut off during extended closure times of the clutch, thus relieving it. This means that the electromagnetic brake keeps the clutch in a desired state without continuing to energize the electric motor. This prevents a so-called baking of the brushes in the traditionally employed direct-current motors that contain brushes during an extended operation without rotational movement or in a tight rotational angle area of the electric motor.

The disadvantage, however, is that the additional electromagnetic brake increases the spatial requirements of a transfer case and raises the manufacturing costs of the transfer case undesirably.

It is, therefore, the aim of the present invention to provide a transfer case, which has low space requirements and is characterized by low production costs.

SUMMARY OF THE INVENTION

The transfer case pursuant to the invention is beneficially provided with an electric motor that is designed as an induction motor, by means of which extended operating phases can be realized in a tight rotational angle area of the electric motor without such damage as is known to occur in practice with direct-current motors. Hence an additional electromagnetic brake can be foregone, allowing the spatial requirements of the transfer case to be easily reduced, and accomplishing decreased production costs for the transfer case.

Moreover, the possibility arises of constructing the electric motor designed as an induction motor to have smaller dimensions as compared with the familiar designs for direct-current motors because induction motors provide higher driving torque at smaller dimensions.

In combination with the aforementioned elimination of the additional electromagnetic brake, a rotating mass of the electric motor is thus reduced, increasing the adjusting dynamics of the transfer case, for example, by up to 20%.

BRIEF DESCRIPTION OF THE DRAWING

The invention will now be described, by way of example, with reference to the accompanying drawings in which.

DETAILED DESCRIPTION OF THE INVENTION

Figure 1:
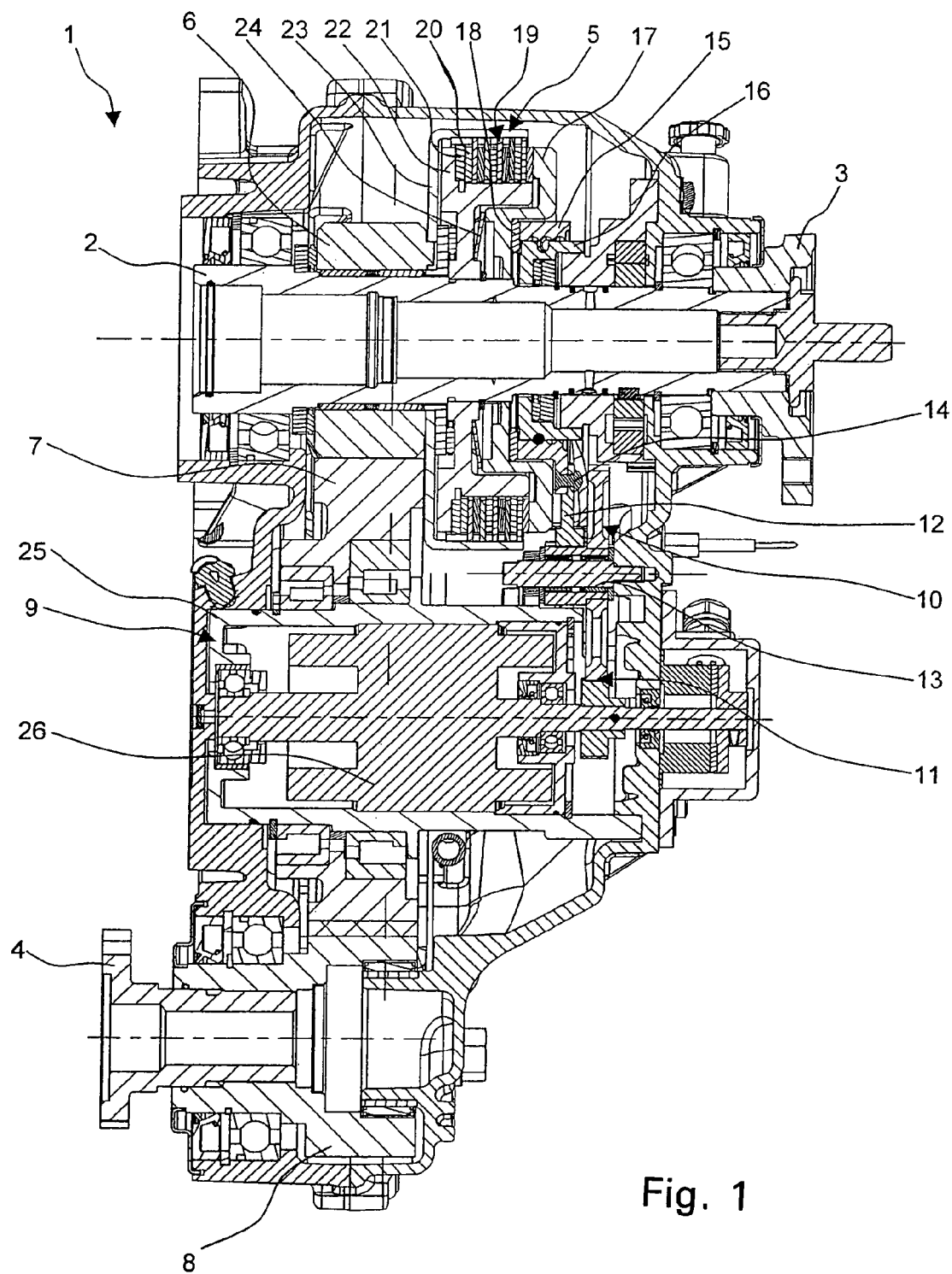
FIG. 1 of the drawing shows a partial sectional view of a transfer case pursuant to the invention comprising a drive converter device, an electric motor and a clutch for activating an output shaft while FIG. 2 of the drawings shows an arrangement in which the spindle nut is rotatably fixed and the spindle can be rotated.

FIG. 1 shows a longitudinal view of a transfer case 1 of a motor vehicle, designed as a longitudinal transfer case, by means of which a driving torque entering via a drive shaft 2 can be directed to two output shafts, wherein of the two output shafts only two connecting flanges 3, 4 are shown, respectively, to which the output shafts are flange-mounted. In the following, when describing the function of the transfer case 1, the two connecting flanges 3, 4 are equated to the output shafts, so that the reference numbers of the two connecting flanges are also used for the two (not depicted) output shafts.

The first output shaft 3 is directly connected to the drive shaft 2, so that the driving torque is guided directly from the drive shaft 2 to the first output shaft 3. The second output shaft 4 is connected via a clutch 5, a first gear wheel 6 that is seated on the drive shaft 2, an intermediate gear 7, and a second gear wheel 8 to the drive shaft 2 when the clutch 5 is in a state in which torque can be transferred via the clutch 5.

The clutch 5 can be actuated by means of an electric motor 9, wherein between the clutch 5 and the electric motor 9 a drive converter device 10 is arranged, by means of which a rotational motion of the electric motor 9 is transformed into a translatory actuating motion for selection of the clutch.

The drive converter device 10 comprises a gear 11, which in the present case is designed as a spur gear. Deviating from this, the gear can also be implemented in another embodiment as a planetary gear set or can have another suitable design.

The drive converter device 10 includes a gear segment ring 12, which engages another gear wheel 13 of the spur gear 11. Additionally, the gear segment ring 12 in the present case is connected via rivets 14 to a spindle nut 15 of a spindle/spindle nut arrangement, so that a rotational motion of the gear segment ring 12 is directly transferred to the spindle nut 15.

It is, of course, up to the discretion of the expert to establish the rotationally fixed connection between the gear segment ring and the spindle nut alternatively to the rivet connection by means of another suitable type of connection such as, for example, a screw, pressed, welded connection or the like.

The spindle nut 15 is arranged on a spindle 16 of the spindle/spindle nut arrangement rotatably and displaceable in the axial direction of the drive shaft 2, wherein the spindle 16 is arranged in the transfer case 1 in a non-rotatable and axially fixed manner.

The spindle/spindle nut arrangement and a pitch of the spindle thread are designed such that, during a closure operation of the clutch 5, the spindle nut 15 exhibits the same direction of rotation as the drive shaft 2. In this manner, drag torque, which occurs due to frictional forces between the spindle nut 15 and the clutch 5, supports the closure process of the clutch 5.

The aforementioned drag torque results from the following design embodiment of the clutch 5 and the drive converter device 10:

The clutch 5 comprises a pressure disk 17, which is connected to the drive shaft 2 so as not to be able to rotate, and thus rotates during operation of the transfer case 1 at the same speed as the drive shaft 2. During a closure operation of the clutch 5, the spindle nut 15 of the drive converter device 10 is displaced in the direction of the pressure disk 17, i.e., in the axial direction of the drive shaft 2, so that frictional forces increase between the pressure disk 17 and the spindle nut 15 as the adjusting travel of the spindle nut 15 increases, and the aforementioned drag torque supports a rotational motion of the spindle nut.

Due to the fact that during the closure operation of the clutch 5 the spindle nut 15 has the same direction of rotation as the drive shaft 2, this drag torque supports the closure process of the clutch 5. A driving torque to be provided by the electric motor 9 is thus reduced during the closure process of the clutch 5 as compared with embodiments known from practice.

With the increasing axial displacement of the spindle nut 15 during the closure operation of the clutch 5, the pressure disk 17 is moved toward a disk configuration 19 of the clutch that is designed as a multi-disk clutch. The disk configuration 19 consists of interior disks 20 and exterior disks 21, wherein the interior disks 20 are connected to an interior disk support 22 such that they cannot rotate but are displaceable in the axial direction of the drive shaft 2. The exterior disks 21 are connected non-rotatably and displaceable in the axial direction of the drive shaft 2 to an exterior disk support 23 which, in turn, is connected non-rotatably to the first gear wheel 6.

The interior disk support 22 is connected non-rotatably and axially non-displaceably to the drive shaft 2, wherein the pressure disk 17 is connected via a spring device 24 designed as a disk spring to the interior disk support 22, against the closure direction of the clutch 5. In this manner, during an opening phase of the clutch 5 in which the spindle nut 15 is moved away from the clutch 5, the pressure disk 17 receives support from the spring device 24 in the direction of the drive converter device 10, reducing or completely eliminating the transfer ability of the clutch 5 as a function of the degree of opening of the clutch 5. The spring essentially serves to open the disk configuration completely, especially during a power failure. The disk configuration as such contains sufficient spring-loaded energy for resetting the electric motor.

In accordance with the transfer ability of the clutch 5 achieved with the above-described selection of the electric motor 9, a portion of the driving torque that is introduced into the transfer case 1 by means of the drive shaft 2 is transferred via the first gear wheel 6, the intermediate gear 7 and the second gear wheel 8 onto the second output shaft 4.

The intermediate gear 7 in the present case is rotatably seated on a housing 25 of the electric motor 9 designed as an induction motor. The configuration of the electric motor 9 in the hollow intermediate gear 7 represents an extremely compact and space-saving design for the transfer case 1, wherein by comparison electric motors that are arranged outside the housing of the transfer case require considerably more space in a motor vehicle.

Moreover the electric motor 9 that is integrated into the transfer case 1 is exposed to significantly fewer environmental conditions since the housing of the transfer case 1 additionally protects it from the environment.

The design of the electric motor 9 as an induction motor offers the possibility of designing the electric motor with smaller dimensions as compared with a version as direct-current motor, since induction motors as compared with direct-current motors, in general, provide greater performance at the same dimensions. In particular, when combined with the aforementioned embodiment of the drive converter device 10, i.e., that the spindle nut 15 during a closure operation of the clutch 5 has the same direction of rotation as the drive shaft 2, this leads beneficially to a considerably smaller dimensional design of the electric motor 9 or the induction motor than a direct-current motor of a familiar transfer case.

Moreover, designing the electric motor 9 as an induction motor offers the advantage that the electric motor 9 has a significantly higher life expectancy since it is operated nearly without wear and is characterized by a high temperature resistance. The induction motor 9 also has a higher adjusting accuracy and a lower weight than a direct-current motor, improving the adjustment dynamics of the transfer case 1 significantly.

Beyond that, deviating from the embodiment of the induction motor 9 shown in the FIGURE, it offers the possibility of cooling the electric motor 9 with transmission oil since a rotor 26 of the induction motor can be operated also in transmission oil or other media, preferably cooling media. This possibility is not offered with direct-current motors, which contain brushes, since such a motor must be enclosed in a completely sealed fashion towards the inside of the transfer case and towards the penetration of transmission oil.

Additionally, by using an induction motor, the use of an electromagnetic brake, by means of which a control torque for the clutch 5 for the purpose of maintaining the clutch in a closed state over an extended period of time is generated, can beneficially be foregone since, contrary to the direct-current motor that comprises brushes, the so-called baking of the brushes when energized without rotational movement does not occur with an induction motor. Such a baking of the brushes in direct-current motors is caused when a direct-current motor is energized over an extended period of time due to the maintenance torque that must be generated, and the direct-current motor does not perform a rotation or is moved only within a small angular range.

Of course in a beneficial embodiment of the transfer case pursuant to the invention (not shown in detail) and deviates from the present embodiment, it can also be provided that an electromagnetic brake for maintaining the clutch in its closed state is integrated in the transfer case if, due to a corresponding requirement, longer closure phases of the clutch are desired, which represent an overload even for an induction motor.

Figure 2:
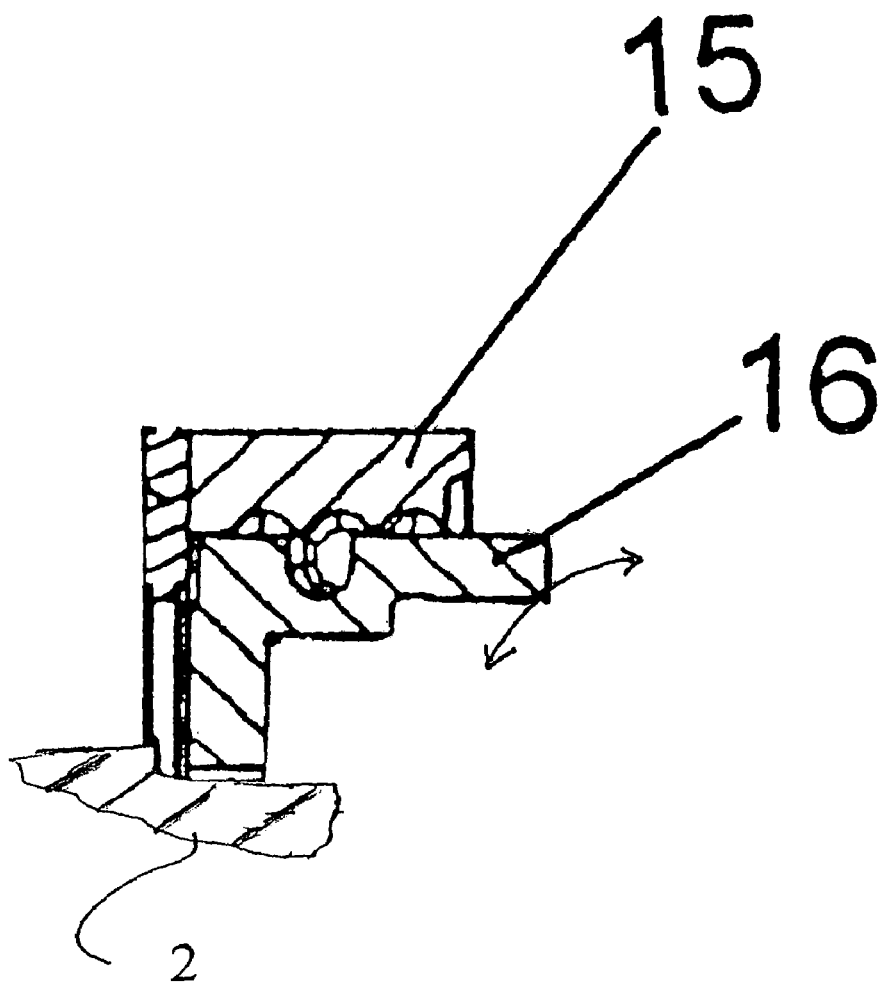

New FIG. 2 shows an arrangement in which the spindle nut 15 is rotatably fixed and the spindle 16 can be rotated by means of the electric motor (9) and the spindle 16, during a closure operation of the clutch 5, has the same direction of rotation as the drive shaft 2.

REFERENCE NUMERALS

1 Transfer Case
2 Drive Shaft
3 First Output Shaft, Connecting Flange
4 Second Output Shaft, Connecting Flange
5 Clutch
6 First Gear Wheel 7 Intermediate Gear
8 Second Gear wheel
9 Electric Motor
10 Drive Converter Device
11 Spur Gear, Gear
12 Gear Segment Ring
13 Additional Gear Wheel
14 Rivets
15 Spindle Nut
16 Spindle
17 Pressure Disk
18 Axial Bearing
19 Disk Configuration
20 Interior Disks
21 Exterior Disks
22 Interior Disk Support
23 Exterior Disk Support
24 Spring Device
25 Housing of the Electric Motor
26 Rotor of the Electric Motor

The invention claimed is:

1. A transfer case (1) with a controllable clutch (5), for a motor vehicle with part-time four-wheel drive, for distributing a driving torque supplied via a drive shaft (2) to at least first and second output shafts (3, 4), wherein the first output shaft (4) can be connected to the drive shaft (2) via the clutch (5) and the clutch (5) can be actuated by an electric motor (9) and a drive converter device (10) is arranged between the electric motor (9) and the clutch (5) for converting rotatory motion of the electric motor (9) into translatory actuating motion for the clutch (5):
wherein the electric motor (9) is an asynchronous induction motor which is accommodated within the transfer case (1); and
a gear wheel (7) transfers a portion of the driving torque from the drive shaft (2) to the first output shaft (4), and the induction motor (9) is integrated in the gear wheel (7).

2. The transfer case according to claim 1, wherein the drive converter device (10) comprises a spindle (16) and a spindle nut (15) arranged thereon.

3. The transfer case according to claim 2, wherein the spindle (16) is fixed and the spindle nut (15) is rotated by the induction motor (9), and the spindle nut (15), during a closure operation of the clutch (5), has a same direction of rotation as the drive shaft (2).

4. The transfer case according claim 2, wherein the spindle nut (15) is fixed and the spindle (16) is rotated by the induction motor (9), and the spindle (16), during a closure operation of the clutch (5), has the same direction of rotation as the drive shaft (2).

5. A transfer case (1) with a controllable clutch (5), for a motor vehicle with part-time four-wheel drive, for distributing a driving torque supplied via a drive shaft (2) to at least first and second output shafts (3, 4), wherein the first output shaft (4) can be connected to the drive shaft (2) via the clutch (5) and the clutch (5) can be actuated by an electric motor (9) and a drive converter device (10) is arranged between the electric motor (9) and the clutch (5) for converting rotatory motion of the electric motor (9) into translatory actuating motion for the clutch (5);
wherein the electric motor (9) is an asynchronous induction motor which is accommodated within the transfer case (1); and
a housing (25) of the induction motor (9) forms a mount for a gear wheel (7) which transfers a portion of the driving torque from the drive shaft (2) to the first output shaft (4).

6. A transfer case (1), for a motor vehicle with part-time four-wheel drive, with a controllable clutch (5) for distributing a driving torque supplied via a drive shaft (2) to at least first and second output shafts (3, 4); and
the second output shaft (4) being connectable to the drive shaft (2) via the clutch (5) and the clutch (5) being actuatable by an electric motor (9) and a drive converter device (10) being arranged between the electric motor (9) and the clutch (5) for converting rotatory motion of the electric motor (9) into translatory actuating motion for the clutch (5);
wherein the electric motor (9) is completely accommodated within a housing of the transfer case (1), and a housing (25) of the electric motor (9) forms a mount for a gear wheel (7) which transfers a portion of the driving torque from the drive shaft (2) to the first output shaft (4).

* * * * *